United States Patent [19]

Katayama et al.

[11] Patent Number: 5,508,925
[45] Date of Patent: Apr. 16, 1996

[54] CONSTANT SPEED RUNNING DEVICE

[75] Inventors: Kazuyori Katayama; Masaaki Miyazaki, both of Hyogo, Japan

[73] Assignee: Mitsubishi Denki Kabushiki Kaisha, Tokyo, Japan

[21] Appl. No.: 389,972

[22] Filed: Feb. 16, 1995

Related U.S. Application Data

[63] Continuation of Ser. No. 9,942, Jan. 27, 1993, abandoned.

[30] Foreign Application Priority Data

Jan. 29, 1992 [JP] Japan ..................................... 4-013595

[51] Int. Cl.$^6$ .................................................. B60K 31/00
[52] U.S. Cl. ...................... 364/426.04; 123/352; 180/197
[58] Field of Search ........................ 364/426.04, 431.07; 123/350, 351, 352; 180/176, 177, 178, 179, 170

[56] References Cited

U.S. PATENT DOCUMENTS

| | | | |
|---|---|---|---|
| 4,723,213 | 2/1988 | Kawata et al. | 180/179 |
| 4,739,485 | 4/1988 | Hayashi | 364/431.07 |
| 4,849,892 | 7/1989 | McCombie | 180/178 |
| 4,914,595 | 4/1990 | Suzuki et al. | 364/426.04 |
| 4,926,334 | 5/1990 | Suzuki et al. | 364/426.04 |
| 4,958,288 | 9/1990 | Takahashi | 364/426.04 |
| 4,960,182 | 10/1990 | Mimura et al. | 180/179 |
| 5,127,487 | 7/1992 | Yamamoto et al. | 180/179 |
| 5,177,682 | 1/1993 | Oo et al. | 180/179 |
| 5,177,683 | 1/1993 | Oo et al. | 180/179 |
| 5,197,563 | 3/1993 | Sakonju et al. | 180/179 |

OTHER PUBLICATIONS

Published English–Language Abstract of Japanese Patent Examined Publication No. Hei. 3–21373, "Constant Speed Running Device for Automobile" Akira Miyazaki, Sep. 19, 1986.

Published English–Language Abstract of Japanese Patent Examined Publication No. Hei. 3–21374, "Constant Speed Running Device for Vehicle", Akira Miyazaki, Jan. 27, 1987.

Primary Examiner—Gary Chin
Attorney, Agent, or Firm—Sughrue, Mion, Zinn, Macpeak & Seas; Richard C. Turner

[57] ABSTRACT

A constant speed running device controls a vehicle speed, which includes a running condition setting member for setting an aimed vehicle speed for at least one of the constant speed control, an acceleration condition and a deceleration condition. The device further includes control member to calculate controlled variables for controlling the vehicle speed in accordance with a deviation between the actual running speed detected by a vehicle speed sensor and the aimed vehicle speed. The running condition setting member sets the aimed vehicle speed to the actual running speed when a predetermined period of time elapses after at least one of operations of the acceleration condition and deceleration condition.

6 Claims, 8 Drawing Sheets

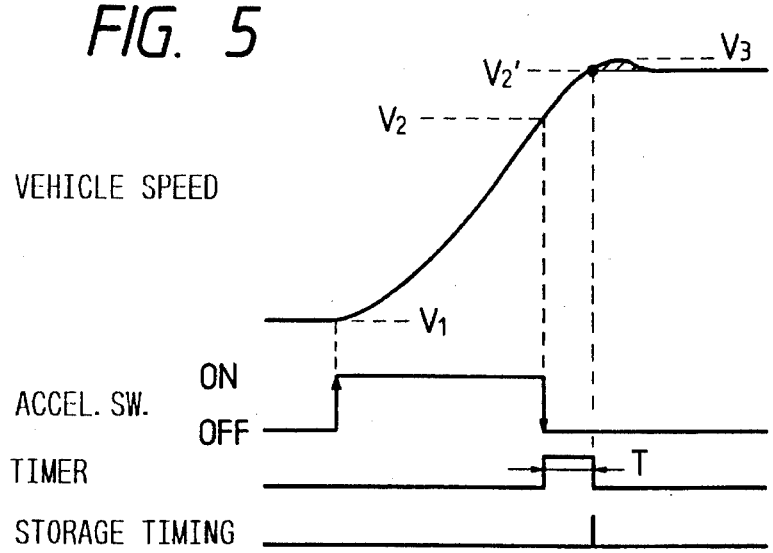
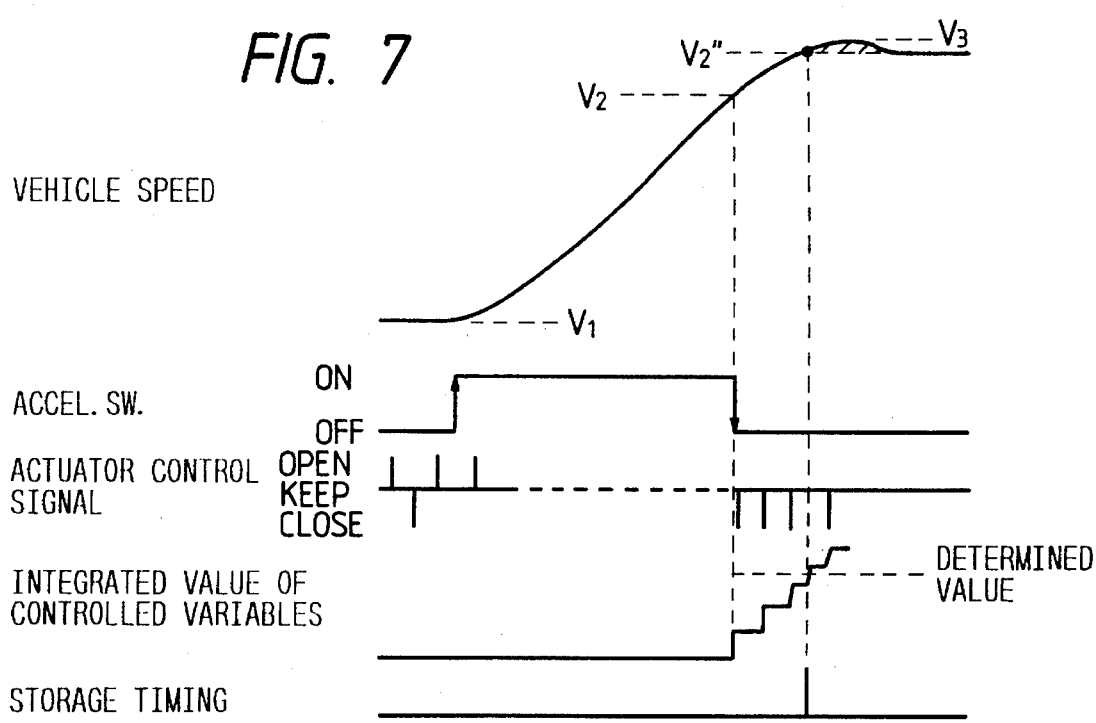

CONSTANT SPEED RUNNING DEVICE

This is a Continuation of application Ser. No. 08/009,942 filed Jan. 27, 1993 now abandoned.

BACKGROUND OF THE INVENTION

This invention relates to a constant speed running device for vehicles to automatically adjust a vehicle speed to a set value.

In a conventional constant speed running device for vehicles to automatically control the opening degree of a throttle so as to adjust a vehicle speed to a set value (a stored speed), there is provided such a system as to increase or decrease the vehicle speed without using a throttle pedal. The system is operated by turning on a hand switch, so-called an accelerator switch (or a coast switch), and during the operating period of the accelerator switch the vehicle speed is increased (or decreased) asymptotically regardless of the set value, and the set speed value stored in a memory is renewed to a latest value at the same time.

FIG. 2 shows a timing chart where a present vehicle speed $V_1$ is asymptotically increased during the operation of the accelerator switch. In the figure, a vehicle speed $V_2$ at the time of turning off the accelerator switch is stored as a set speed in a memory. Thereafter, a feed back control is performed to set the speed $V_2$ as an aimed value. In this case, the vehicle speed overshoots up to the speed value $V_3$ due to a mechanical inertia. FIG. 3 shows a timing chart where a present vehicle speed $V_4$ is asymptotically decreased. A vehicle speed overshoots a speed value $V_5$ at the time of turning off the coast switch up to the low speed value $V_6$ due to a mechanical inertia.

As described above, the conventional device can not stop the change of the vehicle speed immediately after turning off the accelerator switch or the coast switch. Therefore, the vehicle speed is adjusted to the stored value after the occurrence of the overshooting. Accordingly, there is such a problem as to give uncomfortable feeling and shock to a driver.

SUMMARY OF THE INVENTION

Accordingly, this invention has been made to eliminate the above-described difficulties accompanying a conventional vehicle constant speed running device. More specifically, an object of the invention is to provide a vehicle constant speed running device improving the control feeling at the time of automatic control to increase or decrease the vehicle speed.

The foregoing object of the invention has been achieved by the provision of a constant speed running device of vehicle, said device comprising: a speed sensor for generating a signal corresponding to an actual running speed of said vehicle; a running condition setting means for setting an aimed vehicle speed for at least one of said constant speed control condition, an acceleration condition and a deceleration condition, in which the aimed vehicle speed is set to the actual running speed when a predetermined period of time elapses after an operation of at least one of said acceleration condition and said deceleration condition; an aimed speed storing means for storing the aimed vehicle speed set by said running condition setting means; and control means for calculating controlled variables of the vehicle speed in accordance with a deviation between the actual running speed detected by said speed sensor and the aimed vehicle speed stored in said aimed speed storing means.

In a first aspect of the present invention, the running condition setting means is provided with an accelerator switch for setting the acceleration condition, in which a replaced aimed vehicle speed is set to the actual vehicle speed when the predetermined period elapses after turning off the accelerator switch.

In a second aspect of the present invention, the running condition setting means is provided with an accelerator switch for setting the acceleration condition, in which a replaced aimed vehicle speed is set to the actual vehicle speed when the integral value of at least one of the controlled variables of the vehicle speed reaches a predetermined value after turning off the accelerator switch.

In a third aspect of the present invention, the running condition setting means is provided with an acceleration switch for setting the acceleration condition, in which a replaced aimed vehicle speed when the actual vehicle speed reaches a maximum speed after turning off the accelerator switch.

In a fourth aspect of the present invention, the running condition setting means is provided with a coast switch for setting the deceleration condition, in which a replaced aimed vehicle speed is set to the actual vehicle speed when the predetermined period of time elapses after turning off the coast switch.

In a fifth aspect of the present invention, the running condition setting means is provided with a coast switch for setting the deceleration condition, in which a replaced aimed vehicle speed is set to the actual vehicle speed when the integral value of at least one of the controlled variables of the vehicle speed reaches a predetermined value after turning off the coast switch.

In a sixth aspect of the present invention, the running condition setting means is provided with a coast switch for setting the deceleration condition, in which a replaced aimed vehicle speed is set to the actual vehicle speed when the actual vehicle speed reaches a minimum speed after turning off the coast switch.

In the first aspect of the present invention, since the replaced aimed speed is set to the actual vehicle speed when the predetermined period of time elapses after turning off the accelerator switch, the aimed speed increases due to the mechanical inertia.

In the second aspect of the present invention, since the replaced aimed value speed is set to the actual vehicle speed when the integral value of the controlled variable controlling the throttle valve reaches a predetermined value after turning off the accelerator switch, the aimed vehicle speed increases due to the mechanical inertia.

In the third aspect of the present invention, since the replaced aimed vehicle speed is set to the actual vehicle speed when the actual vehicle speed reaches the maximum speed after turning off the accelerator switch, the amount of the overshooting is reduced.

Further, in the fourth, fifth and sixth aspects of the present invention corresponding to the above first, second and third aspects, respectively, after turning off the coast switch, the replaced aimed vehicle speed is set to the actual vehicle speed at the timing represented in the respective aspects. In these aspects, the aimed vehicle speed decreases due to the mechanical inertia. Then, the deviation between the aimed vehicle speed and the amount of the overshooting is reduced.

The nature, utility and principle of the invention will be more clearly understood from the following detailed description and the appended claims when read in conjunction with the accompanying drawing.

BRIEF DESCRIPTION OF THE DRAWINGS

FIG. 5 is a timing chart according to the operation of the first embodiment.

FIG. 7 is a timing chart according to the operation of a second embodiment of the present invention.

DETAILED DESCRIPTION OF THE PREFERRED EMBODIMENTS

Preferred embodiments of this invention will be described with reference to the accompanying drawings.

EXAMPLE 1

A vehicle constant speed running device, which constitutes a first embodiment of this invention, is described with reference to FIG. 1.

Figure 1:
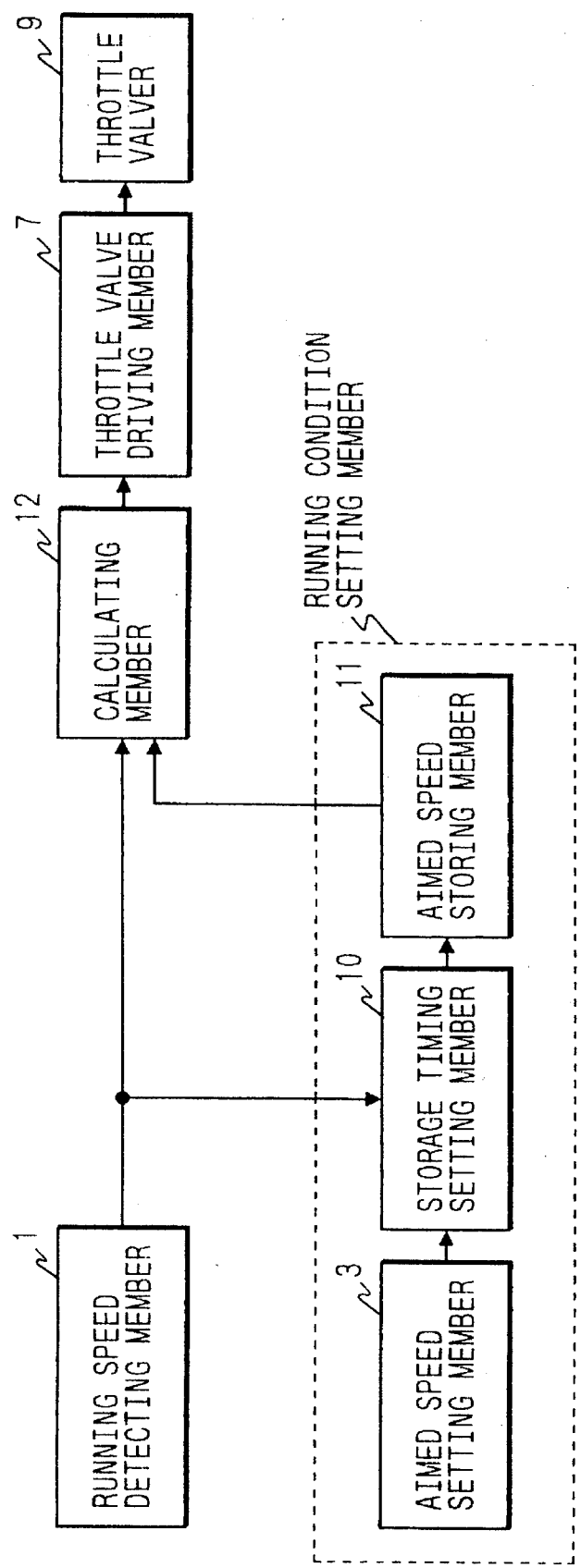
FIG. 1 is a block diagram showing an arrangement of a first embodiment of this invention.

In FIG. 1, an actual speed detecting member 1 detects a vehicle speed. An aimed speed setting member 3 including an accelerator switch and a coast switch is provided for setting an aimed speed of the vehicle. An aimed speed storing member 11 stores the aimed speed. A storage timing setting member 10 sets a storage timing of the aimed speed for the aimed speed storing member 11. The aimed speed setting member 3, the storage timing setting member 10 and the aimed speed storing member 11 are constituents of a running condition setting member. A throttle valve driving member 7 drives a throttle valve 9. A calculating member 12 for controlling the throttle valve driving member 7 receives the running speed and aimed speed as a control member.

Figure 4:
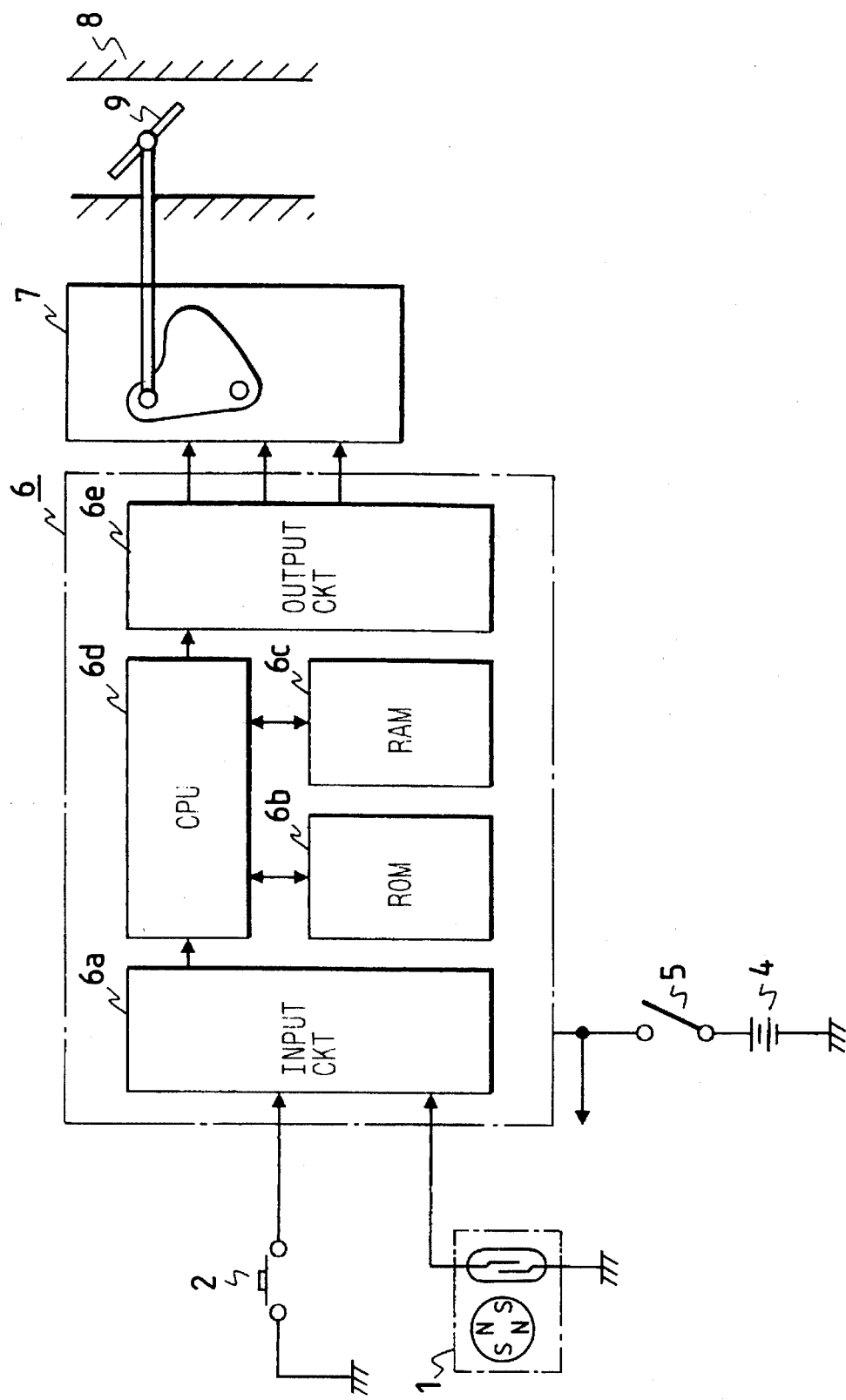
FIG. 4 is an explanatory diagram showing a summarized structure of the first embodiment of the present invention.

FIG. 4 shows a summary of the structure shown in FIG. 1. In FIG. 4, there are provided a cancel switch 2 for stopping the constant speed running, a battery 4, a main switch 5 for starting the constant speed running and an intake pipe 8 for a vehicle. The device also includes a micro-computer 6 which is constituted by an input circuit 6a, a ROM 6b, a RAM 6c, a CPU 6d and an output circuit 6e.

The operation of the constant speed running thus organized will be described according to FIGS. 1 and 4. While the main switch 5 is turned on, the constant speed running device of the present invention becomes operable. The aimed speed which has been set by the aimed speed setting member 3 is stored in the aimed speed storing member 11. Then, the aimed speed thus stored and the actual vehicle speed which has been detected by the running speed detecting member 1 are subjected to a calculation in the calculating member 12. The calculating member 12 calculates controlled variables of the vehicle engine corresponding to the deviation between the aimed speed and the actual speed. An opening degree of the throttle valve 9 is controlled through the throttle valve driving member 7 according to the controlled variables thus calculated. In this case, when the accelerator switch is turned on, the aimed speed setting member 3 generates an acceleration signal which should be stored in the aimed speed storing member 11. Then the calculating member 12 determines controlled variables of the engine according to the stored acceleration signal in the aimed speed storing member 11 and asymptotically increases the opening degree of the throttle valve 9 to increase the vehicle speed according to the calculated variables by the calculating member 12. After that, when the accelerator switch is turned off, the storage timing setting member 10 starts to count down by a timer provided therein and generates a storage timing signal after a predetermined period T elapses. When the storage timing signal from the storage timing setting member 10 is generated, the actual vehicle speed is inputted and stored in the aimed speed storing member 11 as a replaced aimed speed. Thereafter, as far as the off condition of the accelerator switch is continued, the actual vehicle speed is adjusted to the set value for the aimed speed. Accordingly, in comparison with the conventional system which stores the actual vehicle speed as the aimed speed when the accelerator switch is turned off, an aimed value $V_2'$ of the vehicle speed is higher than the aimed value $V_2$ by the risen amount of the speed due to the inertia, and the overshooting amount over the aimed value $V_2'$ is reduced as shown in FIG. 5.

Figure 6:
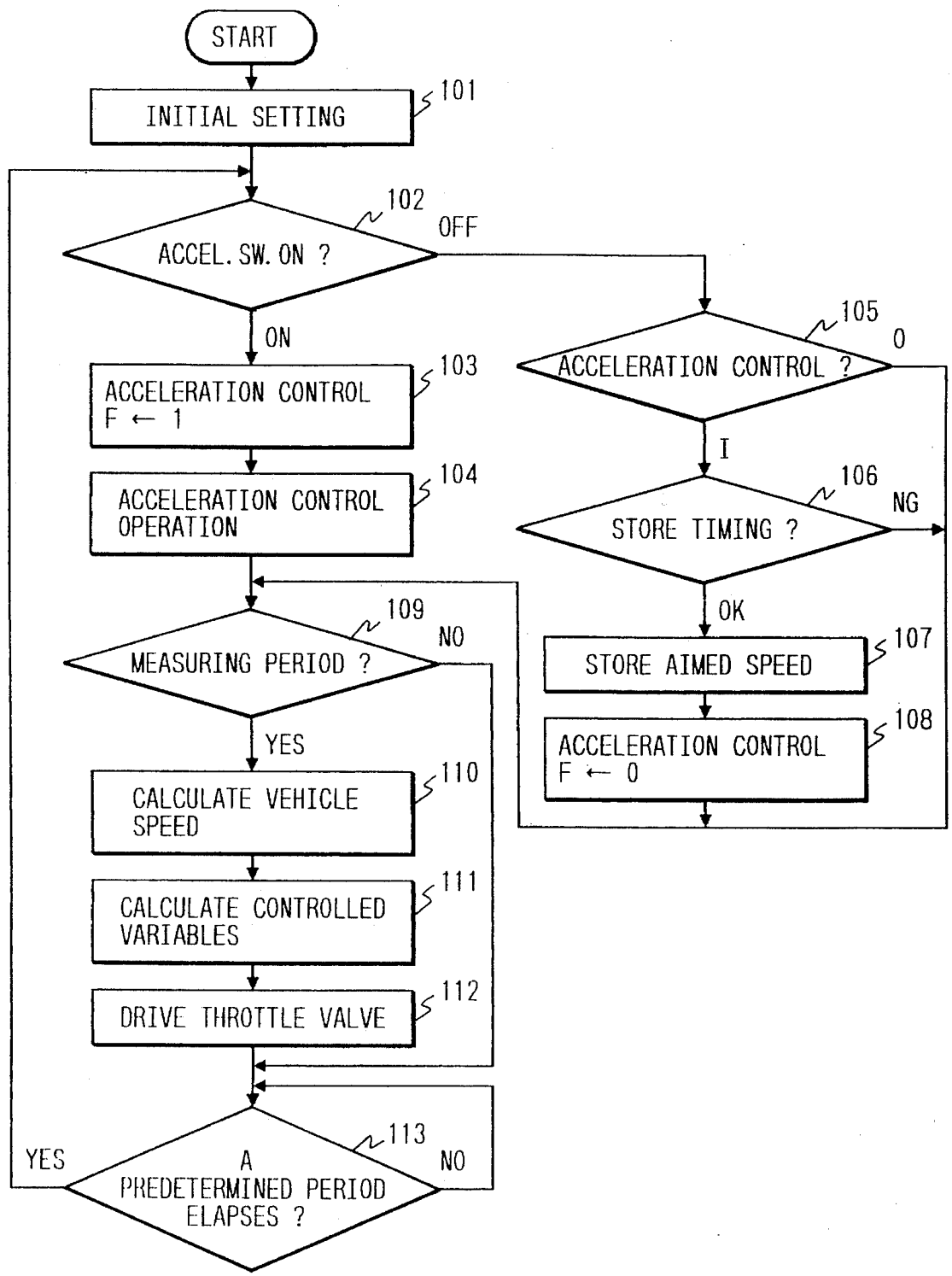
FIG. 6 is a flow chart for explaining the operation of the first embodiment of the present invention.

FIG. 6 shows a flow chart for describing the operation of the above structure of the present invention. In step 101, a variety of initial sets for the constant running is executed. In step 102, it is determined whether or not the accelerator switch is turned on. When the switch is turned on, in step 103, an accelerating control flag F indicating that the accelerating control is being operated is set to "1" in the running condition setting member 13. In step 104, an accelerating control operation is performed so as to increase the actual vehicle speed asymptotically. When the accelerator switch is turned off, step 105 is processed. In step 105, it is detected whether the accelerating control flag F is 1 or 0. In the case of flag F=0, it means that the last operation according to this flow chart has not performed the acceleration process. Then, step 109 is performed. In the case of flag F=1, it means that the last operation according to this flow chart has performed the acceleration process. Then, in step 106 a storage timing is determined. Namely, at the storage timing when a timer provided in the timing setting member 10 indicates that a predetermined period time elapses after the accelerator switch is turned off, the actual value of the vehicle speed is stored as an aimed vehicle speed in step 7. In step 108, the acceleration control flag F is cleared.

When, in step 109, a vehicle speed measuring timing (sampling timing) is detected, a vehicle speed calculation is performed in step 110 and the calculation of controlled variables of the engine is performed in step 111. In step 112, the throttle valve 9 is driven, and in step 113 after passing a predetermined period of time for the operation of the throttle-valve, the operation returns to step 102.

EXAMPLE 2

Figure 2:
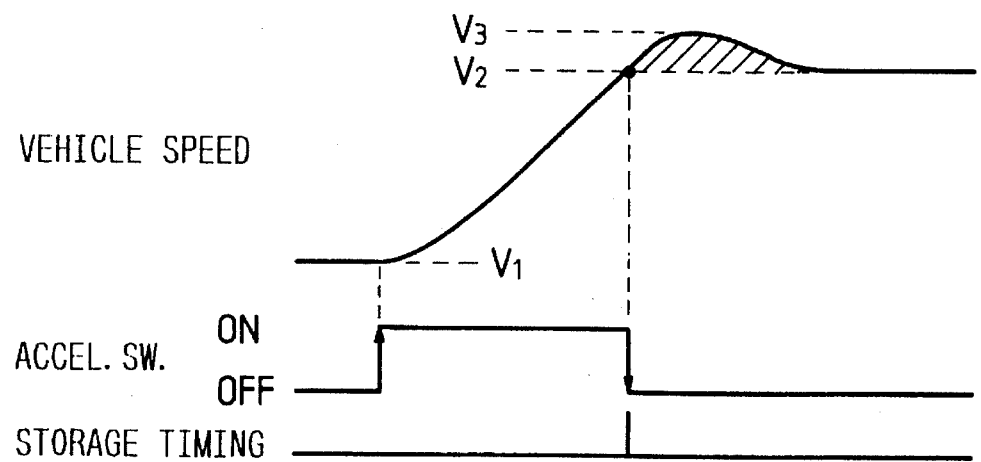
FIG. 2 is a timing chart during automatic acceleration control according to a conventional constant speed running device.

FIG. 7 shows a timing chart for the operation of the vehicle constant running device in accordance with a second embodiment. The second embodiment will be described according to FIGS. 1, 2 and 6. In FIG. 7, after turning off the accelerator switch, the feed-back control is carried out on the basis of the deviation between the aimed vehicle speed $V_2$ and the actual vehicle speed. In this control process, the deviation is increased, since the actual vehicle speed rises as a result of the inertia while the aimed vehicle speed is fixed to a set value $V_2$. Hereupon, an integral value of at least one of the controlled variables calculated by the controlled variable calculating member 12 is increased gradually. When the integral value of at least one of the controlled variable reaches a predetermined value, the storage timing setting member 10 generates a storage timing signal to the aimed speed storing member 11 which sets the actual value $V_2''$ of the vehicle speed as a replaced aimed vehicle speed. In this case, since the actual value $V_2''$ is higher than the value $V_2$, the overshooting is reduced.

EXAMPLE 3

Figure 8:
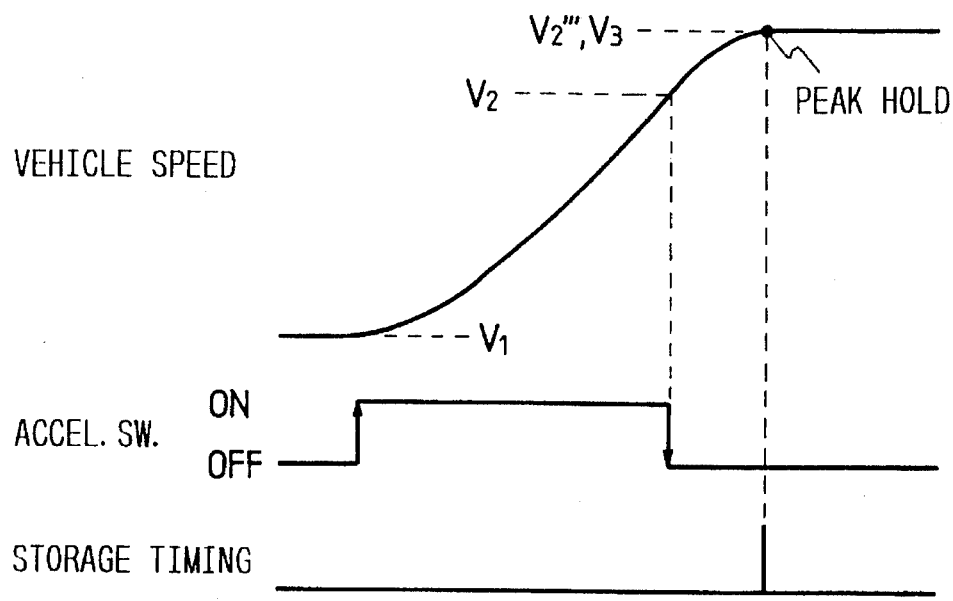
FIG. 8 is a timing chart according to the operation of a third embodiment of the present invention.

FIG. 8 shows a timing chart of the operation of the constant speed running device in accordance with a third embodiment of the present invention. The third embodiment will be described according to FIGS. 1, 2 and 6. In FIG. 8, the storage timing setting member 10 generates a storage timing signal at the time that the actual vehicle speed reaches a maximum value within a predetermined period of time after turning off the accelerator switch. Upon thus receiving the storage timing signal, the aimed speed storing member 11 sets the maximum value $V_2''$ of the vehicle speed as a replaced aimed vehicle speed. For example, the maximum value $V_2'''$ is set to first peak level after receiving the storage timing signal. In this case, the maximum value $V_2'''$ is approximately equal to the overshooting value $V_3$, and the overshooting is virtually eliminated.

EXAMPLE 4

Figure 3:
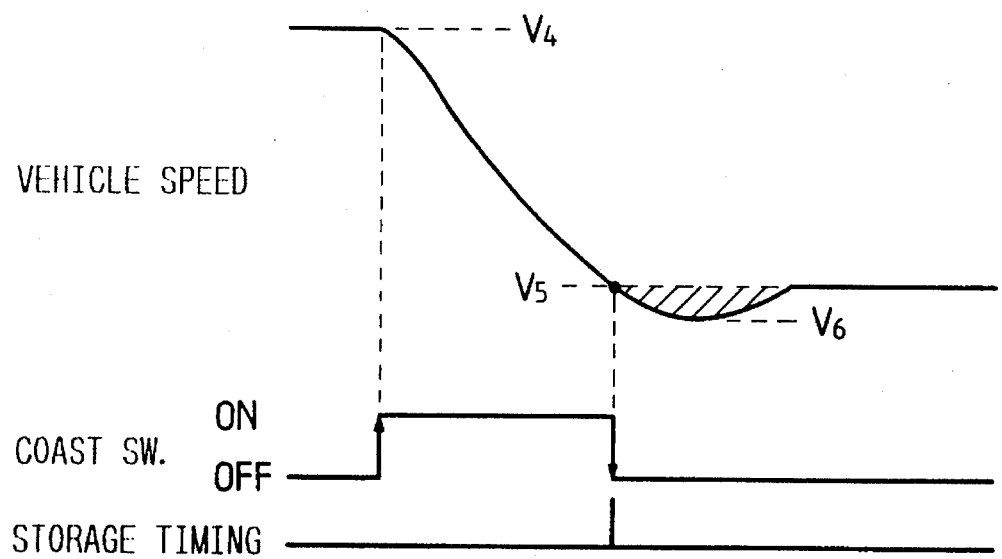
FIG. 3 is a timing chart during an automatic deceleration control according to a conventional constant speed running device.
Figure 9:
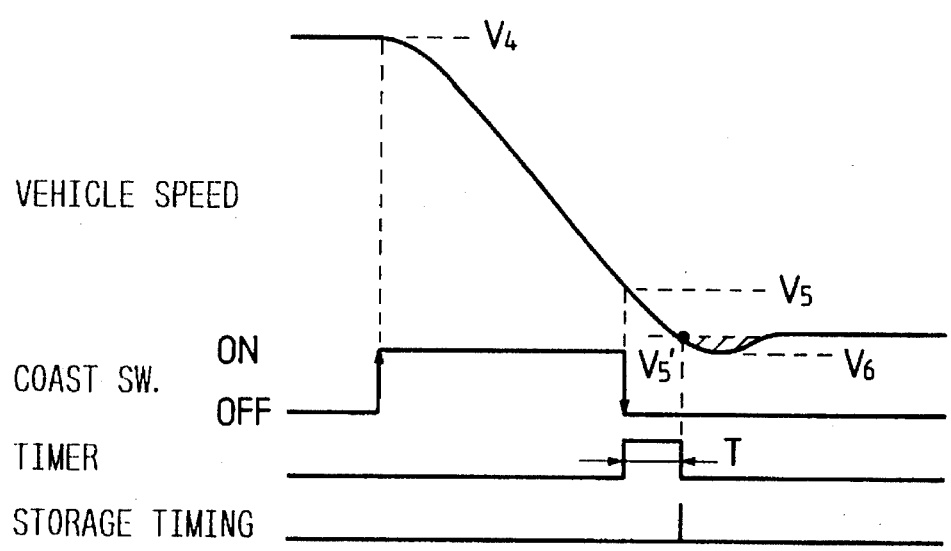
FIG. 9 is a timing chart according to the operation of a fourth embodiment of the present invention.
Figure 10:
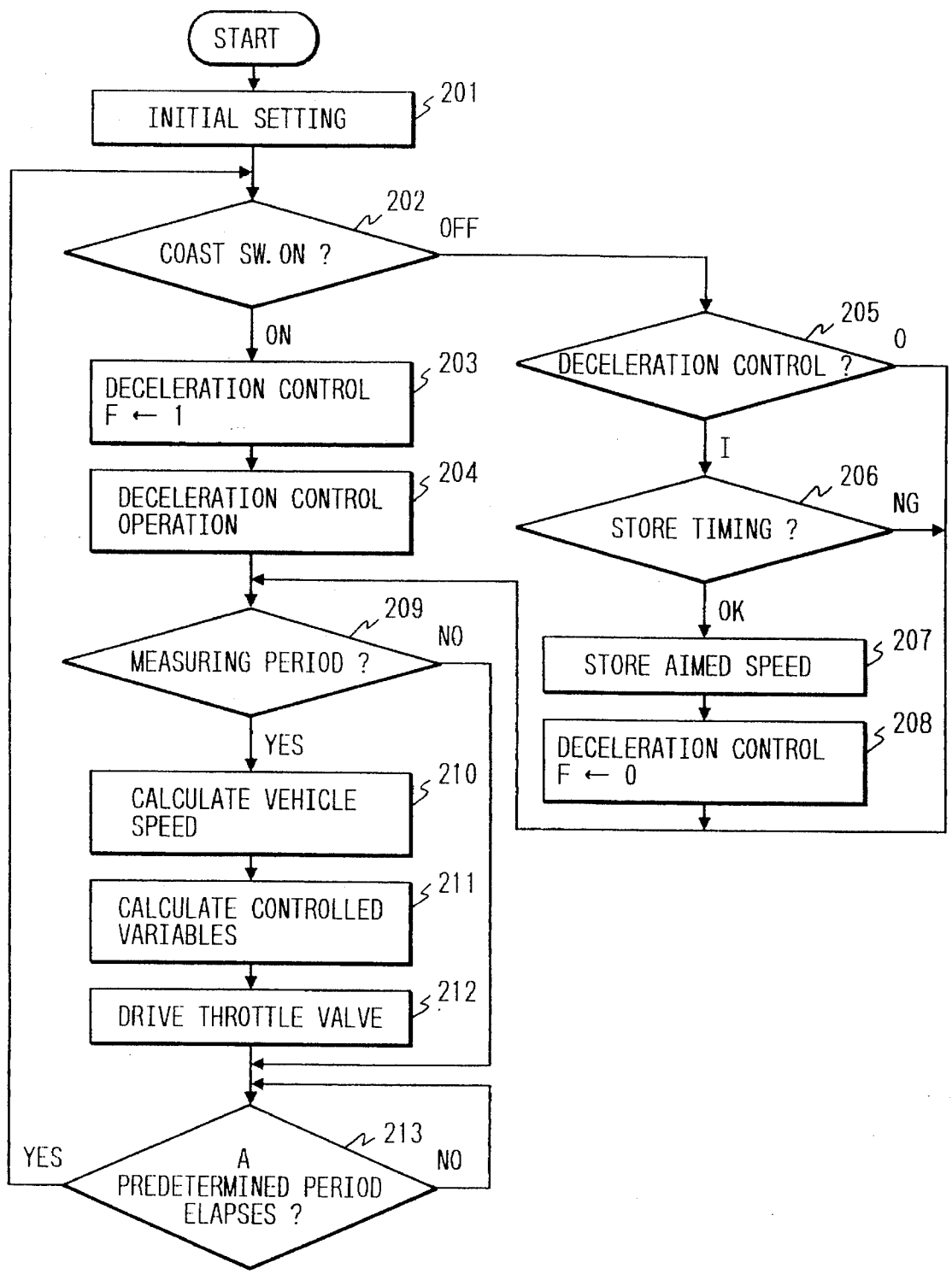
FIG. 10 is a flow chart for explaining the operation of the fourth embodiment of the present invention.

FIG. 9 shows a timing chart for the operation of the constant speed running device in accordance with a fourth embodiment. The fourth embodiment will be described according to FIGS. 1 and 3. In FIG. 9, the throttle opening degree is controlled according to the deviation between the actual vehicle speed and the aimed vehicle speed. When the coast switch is turned on (this is an instruction of speed down), the throttle opening degree is decreased asymptotically so as to reduce the vehicle speed. Then, when the coast switch is turned off, a deceleration control is stopped and the vehicle speed is reduced to a value $V_6$ by virtue of a mechanical inertial to overshoot the value $V_5$. Hereupon, when a time passes a predetermined period T from a start operation of a timer provided in the storage timing setting member 10 which starts at the time turning off the coast switch, the storage timing setting member 10 generates a storage timing signal. The storage timing signal and an actual value $V_5'$ of the vehicle speed at the time of the storage timing are applied to the aimed speed storing member 11 which sets the aimd speed to the actual vehicle speed. Thereafter, as far as the off condition of the accelerator switch is continued, the vehicle speed is adjusted to the set value of the aimed speed. The aimed value $V_5'$ is made lower by approximately the reduced amount of the speed due to the mechanical inertia. Therefore, the overshooting lowering the aimed value $V_5'$ is reduced. FIG. 10 is a flow chart for the operation of the constant speed running device in accordance with the present invention, and is of that the acceleration process shown in FIG. 6 is replaced with the deceleration process.

EXAMPLE 5

Figure 11:
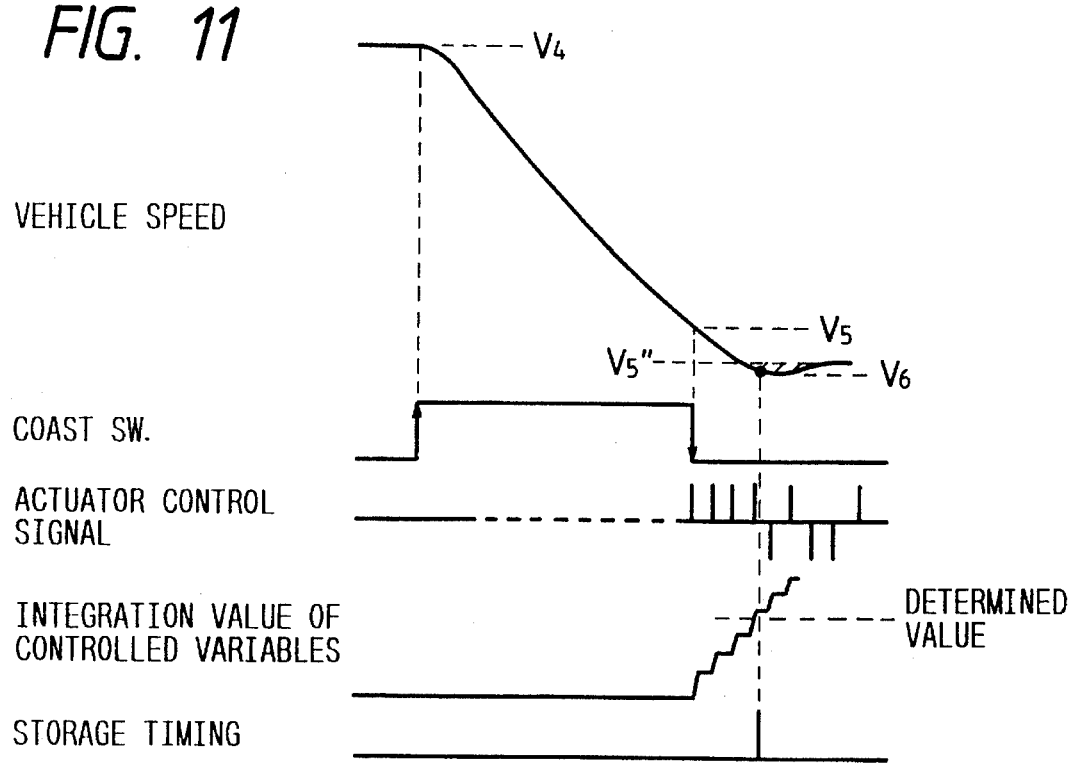
FIG. 11 is a timing chart according to the operation of a fifth embodiment of the present invention.

FIG. 11 shows a timing chart for the operation of the constant speed running device in accordance with a fifth embodiment of the present invention. The fifth embodiment will be described according to FIGS. 1, 3 and 10. In FIG. 11, after turning off the coast switch, the actual vehicle speed is further reduced due to the mechanical inertia. Thereupon, the integrated value of at least one of the controlled variables which is calculated from the deviation between the actual vehicle speed and the aimed speed by the controlled variable calculating member 12 is increased gradually. When the integral value of at least one of the controlled variables reaches a predetermined value, the storage timing setting member 10 generates a storage timing signal to the aimed speed storing member 11 which sets the replaced aimed vehicle speed to the actual value $V_5''$ of the vehicle speed In this case, since the actual value $V_5''$ is lower than the value $V_5$, the overshooting lowering the actual value $V_5''$ (this is the aimed value) is reduced.

EXAMPLE 6

Figure 12:
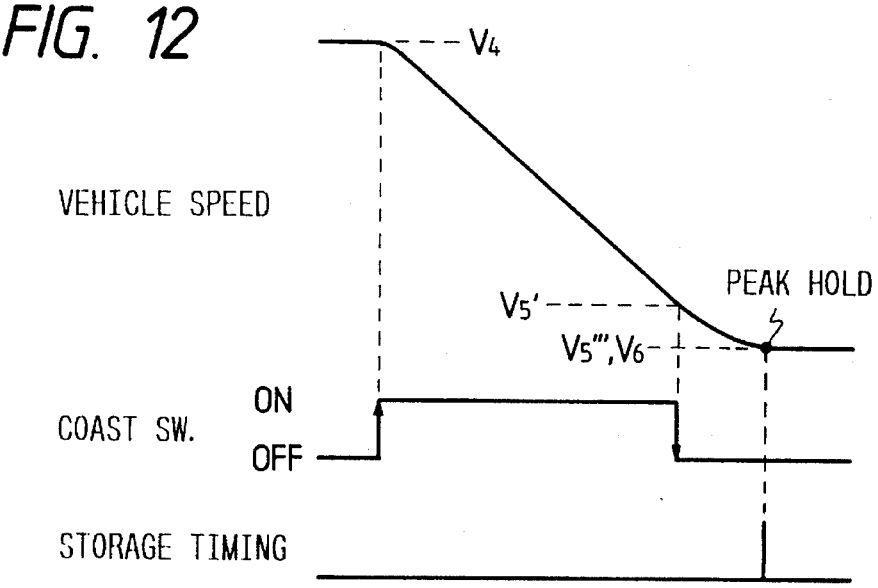
FIG. 12 is a timing chart according to the operation of a sixth embodiment of the present invention.

FIG. 12 shows a timing chart for the operation of the constant speed running device in accordance with a sixth embodiment of the present invention. The sixth embodiment will be described according to FIGS. 1, 3 and 10. In FIG. 12, the storage timing setting member 10 generates a storage timing signal at the time that the actual vehicle speed reaches a minimum value within a predetermined period after turning off the coast switch. Then, the aimed speed storing member 11 sets the minimum value $V_5'''$ of the vehicle speed as a replaced aimed vehicle speed. For example, the minimum value $V_5'''$ is set to first peak level after receiving the storage timing signal. In this case, the minimum value $V_5'''$ is approximately equal to the overshooting value $V_6$, and the overshooting lowering the minimum value $V_5'''$ is virtually eliminated.

As was described above, in accordance with the present invention, after operations of the automatic acceleration or deceleration according to the operation of the accelerator switch or the coast switch, respectively, a replaced aimed vehicle speed is set to the actual vehicle speed. The setting operation is performed, after a predetermined period of time elapsing from turning off these switches, or when the integral value of at least one of the controlled variables reaches a predetermined value, or when the actual vehicle speed reaches a maximum or minimum speed within a predetermined period. Accordingly, the aimed value of the vehicle speed is allowed to come near the value of the overshooting. Thereby, that is to prevent the overshooting and to improve the control feel of the vehicle.

What is claimed is:

1. A constant speed running device for a vehicle, comprising:

a speed sensor for generating a signal corresponding to an actual running speed of said vehicle;

a running condition setting means for setting a target vehicle speed for at least one of a constant speed control condition, an acceleration condition and a deceleration condition, in which the target vehicle speed is set to the actual running speed after a predetermined period of time elapses after an operation of at least one of acceleration condition and said deceleration condition, said actual running speed continuing to increase or decrease due to inertia for an overshoot period of time after the operation of at least one of said acceleration condition and said deceleration condition, said predetermined period of time being set to correspond to said overshoot period of time; and control means for calculating controlled variables of the vehicle speed in accordance with a deviation between the actual running speed detected by said speed sensor and the target vehicle speed set by said running condition setting means, said control variables being used to maintain the actual running speed at the target vehicle speed.

2. A device according to claim 1, wherein said running condition setting means sets the target vehicle speed to the actual running speed, when the integral value of said controlled variables of the vehicle speed reaches a predetermined value after said operation of at least one of said acceleration condition and said deceleration condition, as said predetermined period of time elapses.

3. A device according to claim 1, wherein said running condition setting means sets the target vehicle speed to the actual running speed when the actual running speed reaches at least one of a maximum speed and a minimum speed after each operation of said acceleration condition and said deceleration condition, as said predetermined period of time elapses.

4. A device according to claim 1, wherein said running condition setting means includes, as a target vehicle speed setting means, at least one of an accelerator switch for setting said acceleration condition and a coast switch setting said deceleration condition.

5. A device according to claim 1, wherein said running condition setting means includes a timing setting means for measuring said predetermined period to determine a timing setting the target vehicle speed to the actual running speed, in which said predetermined period is counted from completion of at least one of operations of said acceleration condition and said deceleration condition.

6. A device according to claim 1, wherein said running condition setting means includes a target speed storing means for storing the target vehicle speed set to output a signal corresponding to the target vehicle speed to said control means continuously.

\* \* \* \* \*